United States Patent [19]

Hooke et al.

[11] Patent Number: 4,584,250
[45] Date of Patent: Apr. 22, 1986

[54] BATTERY WITH SLIDEABLY RETRACTABLE ATTACHMENT MEANS

[75] Inventors: John W. Hooke, High Springs; Danny F. Rockett, Alachua, both of Fla.

[73] Assignee: General Electric Company, Gainesville, Fla.

[21] Appl. No.: 568,474

[22] Filed: Jan. 5, 1984

[51] Int. Cl.$^4$ ............................................. H01M 2/10
[52] U.S. Cl. ..................................... 429/97; 429/100; 429/121
[58] Field of Search ........................... 429/100, 96–99, 429/121, 122, 123; 24/3 L, 3 H, 11 S, 11 HC, 467, 458

[56] References Cited

U.S. PATENT DOCUMENTS

| | | | |
|---|---|---|---|
| 1,720,471 | 7/1929 | Fritsch | 24/11 S |
| 2,237,155 | 4/1941 | Malis | 24/11 S |
| 3,665,285 | 5/1972 | Mullersman et al. | 320/2 |

Primary Examiner—Anthony Skapars
Attorney, Agent, or Firm—Henry J. Policinski

[57] ABSTRACT

A portable battery having a case for housing a plurality of rechargeable electrochemical cells includes an attachment clip for supporting the battery during use. The clip is adapted for sliding reciprocating movement from a first retracted position when not in use to a second extended position wherein the clip may be utilized to support the battery case.

9 Claims, 10 Drawing Figures

BATTERY WITH SLIDEABLY RETRACTABLE ATTACHMENT MEANS

BACKGROUND OF THE INVENTION

This invention relates to rechargeble electrochemical cells and batteries and more particularly to cases, for such cells and batteries, having a slideably retractable attachment means for supporting the battery case.

Technological advancements and consumer needs have hastened the adaptation of energy-using devices, normally using line current from a standard AC socket outlet, to portable uses powered by rechargeable batteries. Portable cameras, portable video recorders and portable drills and other tools are but a few among a host of products which have been adapted for portable use. Since these devices are used by consumers at locations remote from conventional AC power outlets for extended periods of time, there is a need to provide portable battery power sources of substantial capacity in order to insure that the device will operate for a length of time sufficient to meet consumer expectations and requirements. This need has led to the development of portable battery packs comprised of a large plurality of rechargeable electrochemical cells encased in a housing or casing having a cord which may be connected to the energy-using device.

Consumers utilizing the aforementioned portable battery packs usually desire to have both hands free to operate the energy-using device and, accordingly, it is convenient for the consumer to carry the portable battery pack on his person. By way of example, U.S. Pat. No. 3,665,285 discloses a portable battery pack having a pair of lugs which may be used in cooperation with a sling to enable the user to carry the portable battery pack over his shoulder. This approach, however, is not entirely satisfactory since the battery pack may be easily inadvertantly dislodged from the person of the user of the energy-using device. Furthermore, the inconvenience associated with attaching and detaching the sling or having the attached sling susceptible to entanglement with other articles is undesireable. Improvements are necessary to overcome the aforementioned and other disadvantages associated with the aforestated prior art attachment means.

It is therefore an object of the present invention to provide a portable battery pack comprised of a plurality of rechargeable electrochemical cells.

It is another object of the present invention to provide a portable battery pack having attachment means which permit secure attachment of the portable battery pack to the person of the user of an energy-using device.

It is still another object of the present invention to provide a battery pack having attachment means which may be utilized to easily and readily secure attachment of the portable battery pack to the person of the user of the energy-using device.

It is still yet another object of the present invention to provide a portable battery pack having attachment means carried by the battery case and extendible therefrom when attachment to the person of the user of an energy-using device is desired.

It is still yet another object of the present invention to provide a battery pack having attachment means that may be retracted, when not in use, into the portable battery pack in such a manner as to be flush with the surface of the pack so as not to permit entanglement with other articles.

SUMMARY OF THE INVENTION

Briefly stated these and other objects which will become apparent from the following detailed description and accompanying drawings are accomplished by the present invention which, in one form, provides a portable battery comprising a generally hollow battery case for housing a plurality of electrochemical cells. The case has at least two opposed major walls disposed generally parallel to each other and defining therebetween a space for housing the electrochemical cells. Attachment means, in the form of a clip adapted for use in supporting the battery case, comprises a first leg extending generally or parallel to one of the major walls of the case and a second leg extending generally perpendicular transverse to the major walls of the case. Means for mounting the clip on the battery case are provided whereby the mounting means slideably support reciprocating movement of the clip in the transverse direction from a first retracted position wherein the first leg of the clip is disposed immediately adjacent and in abutting engagement with the wall of the case to a second extended position wherein the first leg of the clip is spaced apart from the wall of the case whereby the clip may be utilized to support the battery case. Means are also disposed on the battery case for limiting movement of the clip from the wall of the case in said transverse direction. The mounting means is disposed within the space between the opposed case walls and is formed integral with the casing. In the preferred embodiment, the second leg of the attachment means resides in a retracted position in the space between the case walls and the first leg resides in the retracted position entirely within a recess formed in one of the casing walls.

DESCRIPTION OF THE DRAWINGS

While the specification concludes with claims particularly pointing out and distinctly claiming the present invention, the invention will be more readily understood from the following description of the preferred embodiments which are given by way of example with the accompanying drawings in which:

DESCRIPTION OF THE PREFERRED EMBODIMENT

Figure 1:
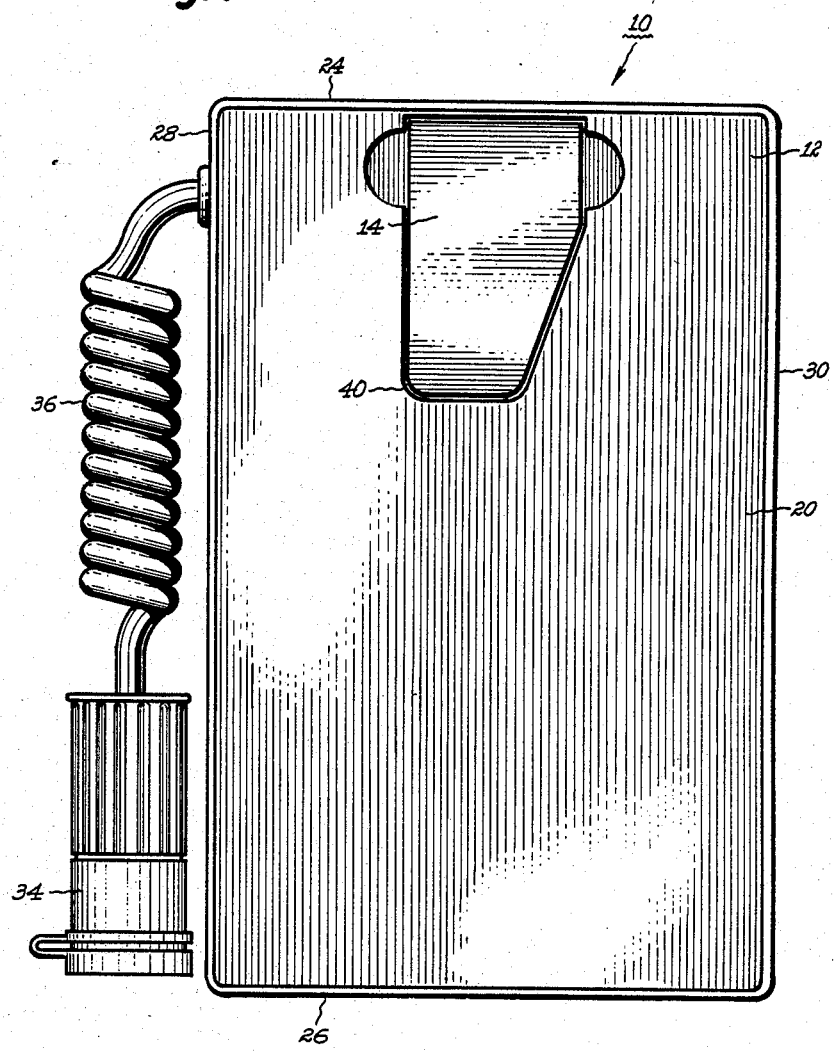
FIG. 1. Depicts a plane view of the battery comprising the present invention.
Figure 2:
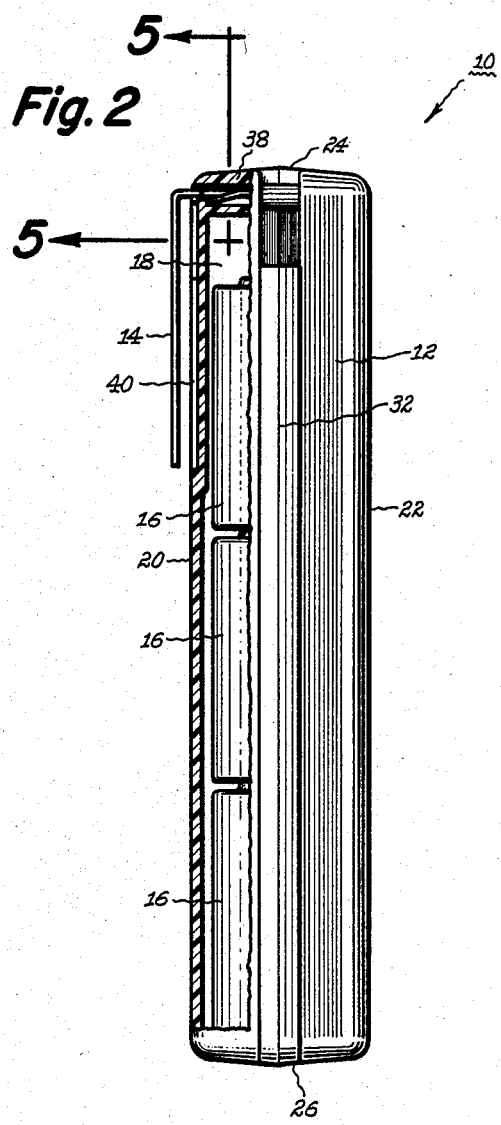
FIG. 2. Depicts a partially cut-away side view of the battery shown in FIG. 1.

Referring now to FIGS. 1 and 2, there is respectively depicted a plane view and a partially cutaway side view of a battery pack, shown generally at 10, comprising the present invention. Battery pack 10 is generally configured as a right rectagular prism and is comprised of a hollow battery case 12 enclosing a plurality of rechargeable electrochemical cells 16 and further including attaching means 14 in the form of a belt clip. Case 12 encloses a space 18 in which cells 16 reside, with space 18 being defined by and between a pair of opposed major front and back walls 20 and 22 disposed generally parallel to one another. Space 18 is further defined by a pair of spaced apart top and bottom walls 24 and 26 and a pair of side walls 28 and 30. Walls 20 and 22 are referred to as "major" walls since together they comprise those uninterrupted surfaces of case 12 which have the largest dimensions and hence the largest surface areas. In the preferred embodiment of the present invention, attaching means 14 is disposed adjacent one of the major walls 20 or 22 and is shown in FIG. 2 disposed adjacent major wall 20. It is advantageous to secure attachment means 14 adjacent to one of the aforesaid major walls 20 and 22 in order to insure that the battery pack 10 is mounted with one of its major walls closely adjacent the person of the user of the battery pack 10 thereby reducing the extent to which the battery pack 10 projects from the person of the user.

Case 12 is fabricated by conventional molding techniques in two halves and then joined together at joint 32 extending around the periphery of case 12. Accordingly, each case half is comprised of one of the major walls 20 or 22 and one-half of each of the walls 24, 26, 28 and 30 all of which are integrally molded to form the case halve.

Battery pack 10 further comprises an electrical terminal 34 adapted for connection to an energy-using device (not shown) and a battery charging device (not shown). Terminal 34 is also connected by current carrying cord 36 to battery case 12 and rechargeable electrochemical cells 16.

Attaching means 14 is mounted on case 12 for slideable reciprocating movement therewith in a direction perpendicular or transverse to major wall 20. More specifically, attaching means 14 is disposed adjacent wall 20 and cooperates with mounting means in the form of clip mount 38 disposed within space 18 between major walls 20 and 22. As will hereinafter be more fully explained attaching means 14 is slideable with respect to case 12 and clip mount 38 from a retracted position, wherein one leg attaching means 14 partially resides within space 18 and the remaining leg of attaching means 14 resides in recess 40 disposed in major wall 20, to an extended position wherein one leg is spaced apart from major wall 20 whereby attaching means 14 may be utilized to support battery case 12 on the person of a user of an energy-using device. Recess 40, in which one leg of attaching means 14 resides in the aforementioned retracted position, is generally configured of a predetermined shape and predetermined depth coinciding with the shape and thickness of attaching means 14.

Figure 3:
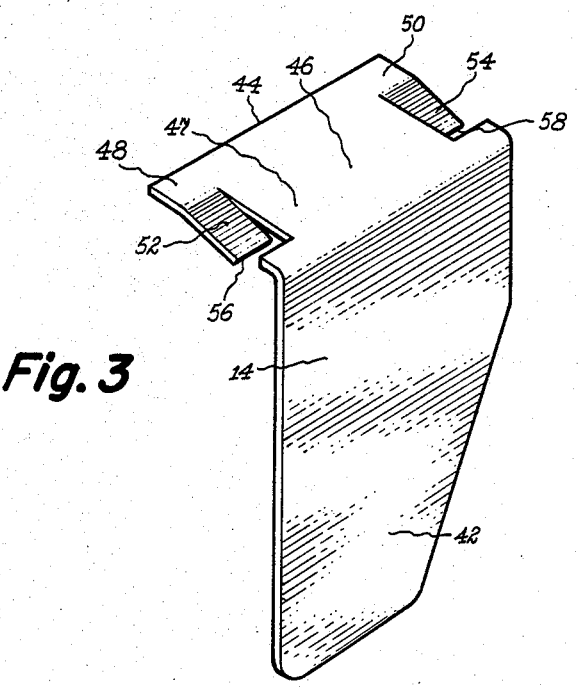
FIG. 3. Depicts an enlarged perspective view of attaching means forming part of the present invention.
Figure 4:
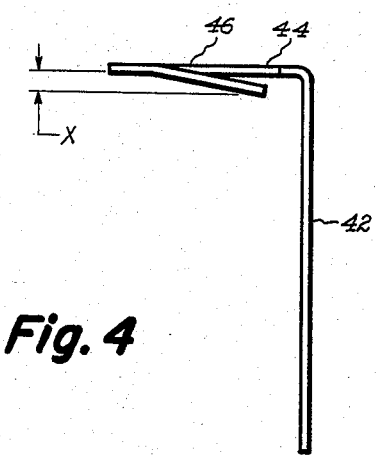
FIG. 4. Depicts a side view of the attaching means shown in FIG. 3.

Referring now to FIGS. 3 and 4 there is depicted, respectively, an enlarged perspective view of attaching means 14 and a side view of attaching means 24. A first substantially flat thin elongated leg 42 of attaching means 14 is integrally connected or otherwise rigidly secured to a second leg 44 depending at an angle, preferrably a right angle, from first leg 42. Legs 42 and 44 each have a length and width substantially greater than their thicknesses. Furthermore, leg 42 has a shape and thickness corresponding to the shape and depth of recess 40 whereby leg 42 may reside entirely within recess 40 when attaching means 14 is in its retracted position. Leg 44 is comprised of a generally T-shaped flat central planar portion 46 of a first predetermined thickness which extends, in the preferred embodiment, at a right angle to leg 42. T-shaped portion 46 is comprised of a base segment 47 joined at one end to adjacent leg 42. A pair of arms 48 and 50 spaced from each other comprise the arms of T-shaped portion 46 and are each disposed remote and spaced from leg 42 of attaching means 14. Leg 44 further includes a second finger portion in the form of a pair of resilient elastically deflectable fingers 52 and 54 extending, respectively, from arms 48 and 50 toward leg 42 of attaching means 14 and terminating, respectively, in finger edges 56 and 58. Fingers 52 and 54 are integrally joined to, and extend out of the plane of, central planar portion 46 such that finger edges 56 and 58 are displaced out of the plane of central planar portion 46 by a distance X in their free undeflected condition as shown best in FIG. 4.

Figure 5:
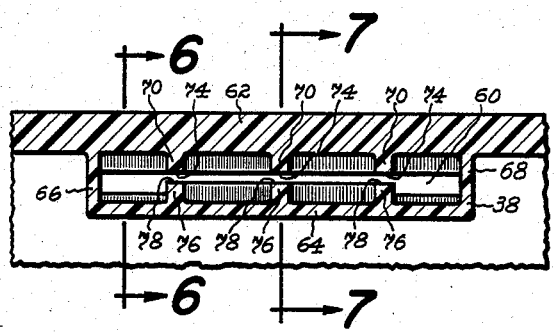
FIG. 5. Depicts an enlarged cross-sectional view taken along line 5—5 of FIG. 1 of the clip mount comprising part of the present invention.
Figure 6:
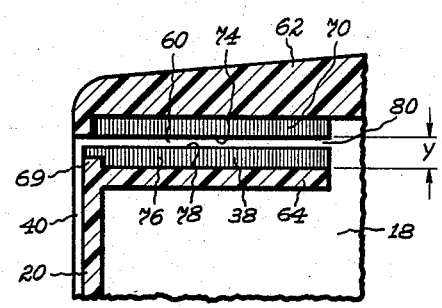
FIG. 6. Depicts an enlarged cross-sectional view taken along the lines 6—6 of FIG. 5.
Figure 7:
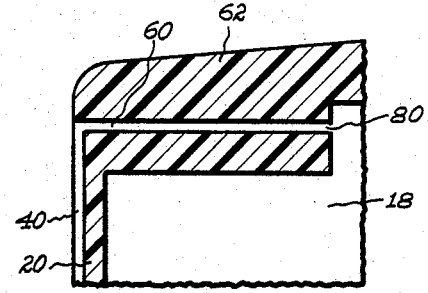
FIG. 7. Depicts an enlarged cross-sectional view taken along the lines 7—7 of FIG. 5.

Attention is now directed to FIGS. 5, 6 and 7 which each depict a view of mounting means in the form of clip mount 38. FIG. 5 is an enlarged cross-sectional view of clip mount 38 taken along the line 5—5 of FIG. 2. FIG. 6 is an enlarged cross-sectional view of clip mount 38 taken along line 6—6 of FIG. 5 and FIG. 7 is an enlarged cross-sectional view of clip mount 38 taken along line 7—7 of FIG. 5. Attaching means 14 are not shown in FIGS. 5, 6 or 7.

Clip mount 38 is disposed within space 18 and is comprised generally of a hollow open-ended rectangular enclosure extending in a direction perpendicular to transverse to major wall 20 and defining a cavity 60 opening at one of its ends into recess 40 and at its other end into space 18. The enclosure defining cavity 60 is comprised of an upper enclosure wall 62 formed by a portion of top wall 24 of casing 12 and further comprised of a bottom enclosure wall 64 and two side enclosure walls 66 and 68 each extending from bottom wall 64 to top wall 62 at the sidemost extremities of cavity 60. The enclosure further includes a lip 69 extending from bottom wall 64 and disposed at one end of cavity 60 adjacent recess 40. Lip 69 may be formed by a portion of major wall 20. Each wall 62, 64, 66 and 68 extends perpendicular or transverse to major wall 20 of battery case 12 and thereby define the transversely extending cavity 60 which is adapted to receive leg 44 of attaching means 14 for sliding reciprocating movement in a manner hereinafter more fully explained.

Within cavity 60, a first plurality of parallel transversely extending to ribs 70, integrally formed with top enclosure wall 62, depend downwardly away from top enclosure wall 62 and toward bottom enclosure wall 64. Each rib 70 terminates at its downwardmost extent in a transversely extending edge surface 74. Also within cavity 60, a second plurality of parallel transversely extending bottom ribs 76, integrally formed with bottom enclosure wall 64, depend upwardly away from bottom enclosure wall 64 and toward top enclosure wall 62. Each bottom rib 76 terminates at its upwardmost extent in a transversely extending edge surface 78. Ribs 70 and 76 and edge surfaces 74 and 78 extend in the direction of reciprocating movement of attachment means 14 between its retracted and extended positions. Each rib 70 is disposed parallel to and in transverse alignment with one of the ribs 76 such that the transversely extending edge surface 74 on rib 70 is disposed adjacent to and in alignment with transversely extending surface 78 on rib 76. Edge surfaces 74 on each rib 70 are spaced apart from each edge surface 78 on ribs 76 to form a gap 80 therebetween having a gap height just slightly greater than the thickness of base segment 47 of leg 44 of attachment means 14. Accordingly then, the thickness of base segment 47 and the height of gap 80 are so dimensioned or preselected so that base segment 47 may reside in gap 80 and is slidingly engaged by edge surfaces 74 and 78 on the pluralities of ribs 70 and 76, respectively, whereby attachment means 14 may be slideably supported for reciprocating movement in a direction transverse to major wall 20 of battery case 12. Ribs 70 and 76, in addition to slideably supporting attachment means 14, function to stiffen enclosure walls 62 and 64, respectively, against deformation and deflection when battery case 12 is supported by attachment means 14 upon the person of the user of battery pack 10.

Clip mount 38 is further configured to receive resilient elastically deflectable fingers 52 and 54 within cavity 60. More specifically, finger 52 resides in cavity 60 between side wall 66 and one rib 76 and finger 54 resides in cavity 60 between side wall 68 and another rib 76. Moreover, the distance between edge surfaces 74 on ribs 70 and bottom wall 64 is slightly less than the sum of the thickness of base segment 47 and the distance X. Dimensioned in this manner, fingers 52 and 54 reside in cavity 60 in a slightly deflected mode thereby creating a force which tends to restrain attachment means 14 against transverse movement due to vibration or other undesireable conditions. While the magnitude of this restraining force is sufficient to prevent undesired transverse movement of attachment means 14, it is not sufficient to prevent transverse movement initiated by the user of the battery pack 10 in extending or retracting attachment means 14.

Figure 8:
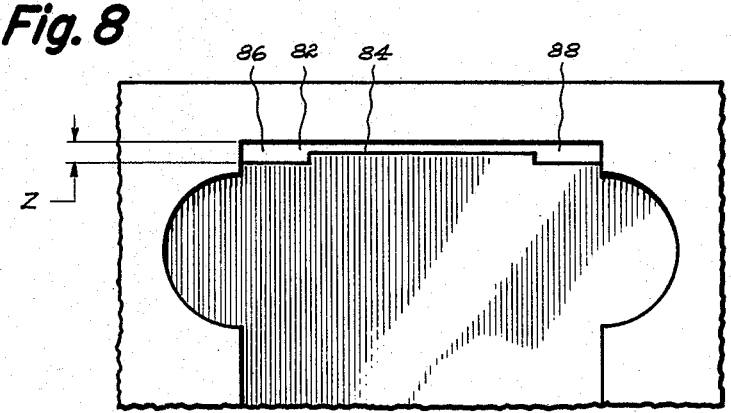
FIG. 8. Depicts an enlarged plane view of a portion of the battery depicted in FIG. 1.

Referring now to FIG. 8 as earlier stated mounting means 38 defines cavity 60 which opens into recess 40. More specifically, cavity 60 opens into recess 40 through opening 82 as best seen in FIG. 8. When viewed in the direction perpendicular or transverse to major wall 20, opening 82 is comprised of a central portion 84 having a height just slightly greater than the thickness of base segment 47 of attachment means 14. Accordingly then, base segment 47 may be inserted without interference into cavity 60 through central portion 84 of opening 82.

In addition to central portion 84, opening 82 is provided with two end portions 86 and 88 disposed at opposite ends of central portion 84. Each end portion 86 and 88 is comprised of a height Z (as shown in FIG. 8) less than the height Y (as shown in FIG. 6). Accordingly, when leg 44 of attachment means 14 is inserted in mounting means 38 through opening 82, fingers 52 and 54 are deflected away from their free height as they each pass through end portions 86 and 88 respectively. Once having passed through the end portions 86 and 88 of opening 82 into cavity 60, end fingers 52 and 54 deflect toward their free height until end fingers 52 and 54 engage wall 64 of clip mount 38. In this position, the sum of the thickness of base segment 47 and the distance fingers 52 and 54 project below the plane containing base segment 47 equals the distance Y between the enclosure wall 64 and the surface 74 on ribs 70. Having thus expanded after being inserted into cavity 60, fingers 52 and 54 are prevented from exiting cavity 60 by lip portion 69 of major wall 20. Lip portion 69 serves as an abutment stop adapted to engage fingers 52 and 54. Since the distance of the lip 69 from the edge surfaces 74 on ribs 70 is less than the distance Y, fingers 52 and 50 are entrapped within cavity 60 and attachment means 14 is permanently slideably affixed to case 12.

Figure 9:
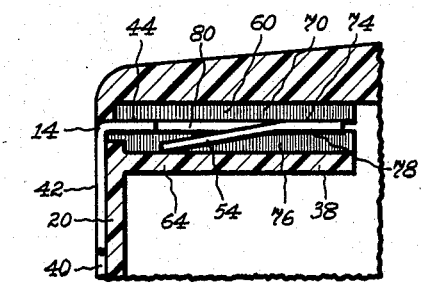
FIG. 9. Depicts an enlarged cross-sectional view of the battery case and retracted attachment means comprising the the present invention.
Figure 10:
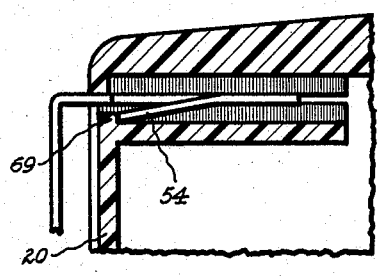
FIG. 10. Depicts an enlarged cross-sectional view of the battery case and extended attachment means comprising the present invention.

Referring now to FIGS. 9 and 10, there is depicted a cross-section of battery case 12 and attachment means 14. FIG. 9 depicts the attachment means 14 in the retracted position and FIG. 10 depicts the attachment means 14 in the extended position. As viewed in FIG. 9, attachment means 14 may be stowed in a retracted position wherein leg 42 of attachment means 14 resides entirely within recess 40 and leg 44 resides entirely within cavity 60 of mounting means 38. More specifically, first planar portion 46 of attachment means 14 is disposed within gap 80 and is slideably engaged and supported by edge surfaces 74 on ribs 70 and 78 on ribs 76 for sliding reciprocating movement. Furthermore, fingers 52 and 54 of leg 44 are disposed in cavity 60 and are slightly deflected from their free height by engagement with bottom wall 64.

When the user of battery pack 10 desires to utilize attachment means 14 to support battery pack 10 on his person, he may slide attachment means ar from its retracted position of FIG. 9 to its extended position in FIG. 10. In accomplishing this task, the user slides attachment means 14 to the left (as viewed in FIGS. 9 and 10) until fingers 52 and 54 engage lip 69 of major wall 20. During movement, mounting means 14 is slideably supported through sliding engagement of planar portion 46 of leg 44 with edge surfaces 74 and 78 of ribs 70 and 76 respectively. Lip 69 serves as abutment stop means for preventing removal of leg 44 entirely out of mounting cavity 60. In the extended position, attachment means 14 may be slipped over the belt of the user of battery pack 10 thereby supporting the battery pack 10 on the person of the user. When the user desires to remove the battery pack 10 from his person, he removes the mounting means 14 from engagement with his belt and slides attachment means 14 to the right (as viewed in FIGS. 9 and 10) until leg 42 of attachment means 14 resides entirely within recess 40 of major wall 20. In this position attachment means 14 is stowed within the prospective confines of recess 40 and entanglement with other articles is averted.

From the foregoing, it is now apparent that a portable battery case has been provided which is well adapted to fulfill the aforestated objects of the present invention and though only a preferred embodiment of the invention has been described for purposes of illustration, it should be understood that other equivalent forms of the invention are possible within the scope of the appended claims.

Having thus described the invention, what is claimed as new and useful and desired to be secured by U.S. Letters Patent is:

We claim:

1. A portable battery comprising:
   a plurality of rechargeable electrochemical cells;
   a generally hollow battery case for housing said plurality of electrochemical cells, said case having at least two opposed major walls disposed generally parallel to each other and defining therebetween a space for housing said electrochemical cells;

a clip adapted for use in supporting said battery case, said clip having a first leg extending generally parallel to one of said major walls and a second leg extending generally transverse to said one of said major walls, said second leg including a deflectable portion;

means for mounting said clip on said battery case, said mounting means slideably supporting reciprocating movement of said clip in said transverse direction from a first retracted position wherein said first leg of claim clip is disposed immediately adjacent said one of said walls to a second extended position wherein said first leg of said clip is spaced apart from said one of said walls whereby said clip may be utilized to support said battery case; and means disposed on said battery case for limiting movement of said clip away from said one of said walls in said transverse direction, said deflectable portion of said second leg deflectable in a direction parallel to said opposed walls upon first insertion of said second leg into said space to thereby cooperate with said movement limiting means to entrap said deflectable portion within said space and permanently affix said clip to said case.

2. The invention as set forth in claim 1 wherein said mounting means is disposed within said space between said opposed walls and is formed integral with said case.

3. A portable battery comprising:

a plurality of rechargeable electrochemical cells; a generally hollow battery case for housing said plurality of electrochemical cells, said case having at least two opposed major walls disposed generally parallel to each other and defining therebetween a space for housing said electrochemical cells, said case including a recess in the exterior surface of one of said walls, said recess being of a predetermined shape and depth, said case further including a clip mount disposed between said major walls and extending from said one of said major walls toward the other of said major walls, said clip mount defining a mounting cavity opening into said recess;

a clip adapted for use in supporting said battery, said clip comprising a substantially flat first leg having a shape substantially corresponding to said predetermined shape of said recess and a thickness less than the said predetermined depth of said recess whereby said first leg of said clip may reside entirely in said recess, said clip further comprising a second leg rigidly secured to and extending at an angle from said first leg, said second leg having a generally flat first planar portion of a first predetermined thickness and a second finger portion extending from said first portion at an angle out of said plane, said first planar portion of said second leg extending into said space between said major walls and into said mounting cavity and being slidingly supported by said clip mount for slidingly supporting said clip for sliding reciprocating movement from a first retracted position wherein said first leg of said clip resides entirely within said recess to a second extended position wherein said first leg of said clip is spaced apart from said one of said walls whereby said clip may be utilized to support said battery case, said second finger portion of said second leg cooperating with said one of said major walls to prevent removal of said second leg entirely out of said mounting cavity.

4. The invention as set forth in claim 3 wherein said mounting cavity is defined partially by a top wall and a bottom wall spaced apart from said top wall, said top and bottom walls extending in a direction generally parallel to the direction of said reciprocating movement of said clip, said top and bottom walls including means for slidingly engaging said planar portion of said second leg to thereby support said clip for said sliding reciprocating movement.

5. The invention as set forth in claim 4 wherein said mounting cavity is further defined by at least a portion of said one of said opposed major walls, said portion of said major wall defining stop means cooperating with said second fingered portion of said second leg to prevent removal of said second leg of said clip entirely from said mounting cavity.

6. The invention as set forth in claim 5 wherein said means for slidingly engaging said planar portion of said second leg comprises a first and second plurality of ribs depending respectively from said top and bottom walls toward said planar portion, said ribs in each of said pluralities extending in a direction generally parallel to the direction of said reciprocating movement of said clip, said ribs in each of said pluralities terminating in an edge surface in sliding supporting engagement with said first planar portion of said second leg of said clip.

7. A portable battery comprising:

a plurality of rechargeable electrochemical cells;

a generally hollow battery case for housing said plurality of electrochemical cells, said case having at least two opposed major walls disposed generally parallel to each other and defining therebetween a space for housing said electrochemical cells, said case further including a clip mount disposed between said major walls and extending from one of said major walls toward the other of said major walls, said clip mount defining a mounting cavity;

a clip adapted for use in supporting said battery, said clip comprising a substantially flat first leg and a second leg rigidly secured to and extending at an angle from said first leg, said second leg having a generally flat first planar portion and a second finger portion extending from said first portion at an angle out of said plane, said first planar portion of said second leg extending into said space between said major walls and into said mounting cavity and being slideably supported by said clip mount for slidingly supporting said clip for sliding reciprocating movement from a first retracted position wherein said first leg of said clip resides immediately adjacent to said one of said major walls to a second extended position wherein said first leg of said clip is spaced apart from said one of said walls whereby said clip may be utilized to support said battery case, said second finger portion of said second leg cooperating with said one of said major walls to prevent removal of said second leg entirely out of said mounting cavity.

8. A portable battery comprising:

a plurality of rechargeable electrochemical cells;

a generally hollow battery case for housing said plurality of electrochemical cells, said case having at least two opposed major walls disposed generally parallel to each other and defining therebetween a space for housing said electrochemical cells, one of said walls having an opening communicating said space with the exterior of said battery case;

a clip mount disposed between said major walls and extending from said one of said major walls to the other of said major walls;

a clip adapted for use in supporting said battery comprising a substantially flat first leg and a second leg rigidly secured to and extending at an angle from said first leg, said second leg having a generally flat first planar portion and an elastically deflectable second finger portion extending from said first portion at an angle out of said plane, said second leg extending through said opening and into said space between said major walls and into said clip mount and being slidingly supported by said clip mount sliding reciprocating movement from a first retracted position wherein said first leg of said clip resides immediately adjacent to said one of said major walls to a second extended position wherein said first leg of said clip is spaced apart from said one of said walls whereby said clip may be utilized to support said battery case; and abutment means disposed on said clip mount adjacent said opening in said one of said walls, said elastically deflectable finger portion adapted to pass over said abutment means in a deflected condition upon the first insertion of said second leg into said space, said deflectable finger portion being further adapted to deflect toward its free height position after having passed by said abutment means whereby said abutment means prevents removal of said second leg from said space between said opposed walls.

9. A portable battery comprising:

a plurality of rechargeable electrochemical cells;

a generally hollow battery case for housing said plurality of electrochemical cells, said case having at least two opposed major walls disposed generally parallel to each other and defining therebetwen a space for housing said electrochemical cells;

a clip adapted for use in supporting said battery case, said clip having a first leg extending generally parallel to one of said major walls and a second leg extending generally transverse to said one of said major walls;

means for mounting said clip on said battery case, said mounting means slideably supporting reciprocating movement of said clip in said transverse direction from a first retracted position wherein said first leg of said clip is disposed immediately adjacent said one of said walls to a second extended position wherein said first leg of said clip is spaced apart from said one of said walls whereby said clip may be utilized to support said battery case;

means disposed in said battery case for limiting movement of said clip away from said one of said walls in said transverse direction; and deflectable means disposed within said space and deflectable in a direction parallel to said opposed walls upon first insertion of said second leg into said space, said deflection cooperating with said movement limiting means to entrap said second leg of said clip within said space and permanently affix said clip to said case.

* * * * *